B. B. PERKINS.
SILAGE COVER.
APPLICATION FILED FEB. 15, 1921.
1,429,624. Patented Sept. 19, 1922.
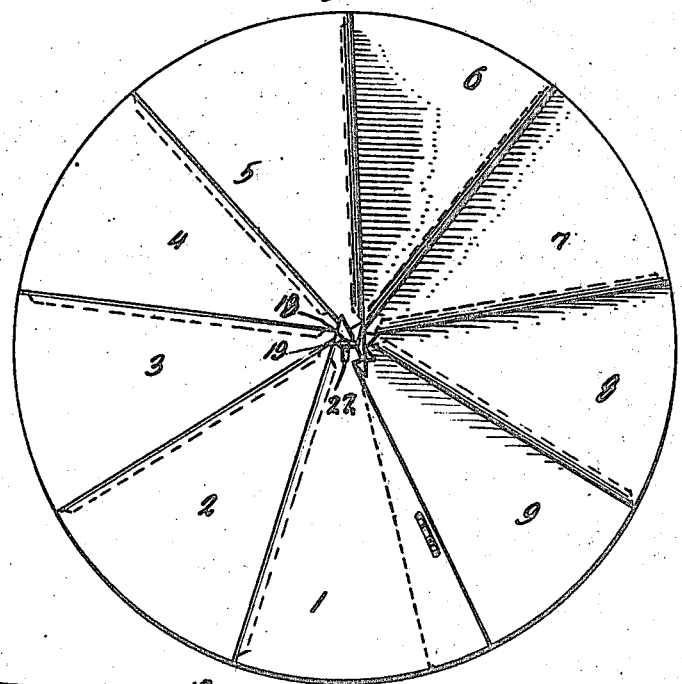
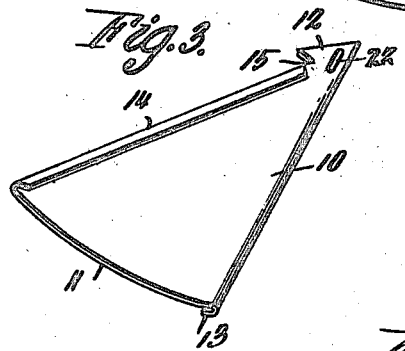
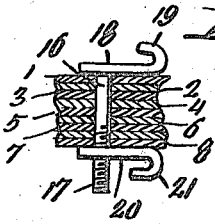
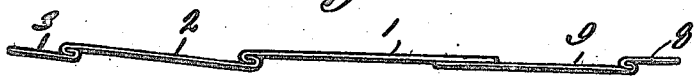
WITNESSES
BERT B. PERKINS
INVENTOR.
BY
ATTORNEY.

Patented Sept. 19, 1922.

1,429,624

UNITED STATES PATENT OFFICE.

BERT B. PERKINS, OF MONTICELLO, MINNESOTA.

SILAGE COVER.

Application filed February 15, 1921. Serial No. 445,150.

*To all whom it may concern:*

Be it known that I, BERT B. PERKINS, a citizen of the United States, residing at Monticello, in the county of Wright and State of Minnesota, have invented certain new and useful Improvements in Silage Covers, of which the following is a specification.

The invention provides an air-tight cover means to be used in connection with silos for covering the green silage with which the same are filled and to be kept in place until the silage is cured and the silo ready to be opened to begin feeding.

Usually, while the silage is undergoing the curing process, there is a considerable loss or deterioration on the top by mold and rot, which is caused by air working into the wet, green, silage, and causing it to rot and mold continuously or until eventually an air-tight cover is formed by the rotted mass itself, which thus prevents the air from penetrating further down and ruining the remainder of the silage. In many instances, this loss runs up into tons of silage which is useless for feeding purposes.

It is, therefore, the purpose and object of this invention to provide means capable of use within a silo, and above the silage to prevent air from penetrating the top of the silage; thereby saving all of the feed.

An additional object is to provide a silage cover which may be supported upon the top of the silage mass for following down the silo as the silage is used, the said cover having folding elements separately movable to provide openings for removing the silage, whereby the latter may be used as slowly as desired without danger of any of the top being damaged by being exposed to the air too long.

An additional object is to provide a silage cover of the character specified comprising a number of elements relatively overlapping and connected to provide a collapsible structure, all of the elements being separately or jointly adjustable from a common center.

With the above and other objects in view, the invention may be said to reside generally in the details of construction, combination and arrangement of parts as will be hereinafter more fully pointed out and described, reference being had to the accompanying drawings, wherein—

Figure 1 is a top plan view of the silage cover,

Figure 2, an end view thereof,

Figure 3, a detail, perspective view of one of the cover elements or shutters, and Figure 4, a detail, sectional view disclosing the manner in which the shutters are relatively connected at their inner ends or center of the cover.

As stated above, the nature and purpose of the invention is to provide means for use in connection with silos after the latter has been filled, to cover the silage and prevent air from penetrating the top of the silage to any considerable depth and thereby spoiling the top of the same. Hence, the invention contemplates the use of any means suitable for carrying out the objects stated.

For present purposes of description and illustration, the invention is shown as embodying a cover of circular form and consisting of a plurality of cover elements or shutters 10. There may be as many of these shutters as desired, although the cover is here illustrated as consisting of but nine. The shutters are consecutively numbered from 1 to 9 to indicate their relative arrangement. These shutters may be made of either metal or wood but it is preferable that they be made of galvanized iron. Each shutter is, approximately, of similar construction and, as indicated in Figure 3, is of triangular shape having an arcuate outer edge 11 and a spear head or point 12. The longitudinal edges of the shutter are crimped on opposite sides of the body portion to provide engaging edges 13 and 14, the latter terminating inwardly of the point 7, as indicated at 15. In the assembling of the cover, the shutters are relatively arranged so that each successively overlaps the other with the last shutter 9 overlapped by shutter 1, as shown in Figure 2 of the drawings. When so arranged the crimped engaging edge on the under side of shutter No. 1 will engage into the crimped edge on the upper side of shutter No. 2, and so on clear around until a complete circle is formed, with shutter No. 1 overlapping shutter No. 9. The crimped engaging edges of the shutters may be of considerable width, or depth, if desired, in order to allow for considerable latitude of movement for the possible adjustment of the plates laterally across or under one another. For convenience in pulling the shutters around to position, handle or grip means of any suitable character may be provided on shutter 1, as shown.

For holding the shutters together at the center of the cover, a bolt or pin fastener of the character illustrated in Figure 4 is employed. This bolt includes a shank 16 which forms the axis about which the shutters are adjustable in the arc of a circle, which shank has its lower portion threaded as indicated at 17. The head 18 of the bolt is extended on one side to provide a hook 19. Engaging the threaded shank of the bolt is a nut 20 likewise formed with a hook 21. The object of the hooks is to provide means whereby the cover may be hung up, when it is not in use, and the shutters are slid together. Any suitable means, such as a chain or rope may be fastened to each hook to hang the cover by and the same may be hung from a hook provided at the top of the silo for that purpose. The cover would thus be out of the way, and yet at hand, ready for use again when the silo is next used. It is to be noted that each shutter is provided with an elongated bolt-hole or slot 22 formed in the end 12 thereof, which slot enables the shutter to be adjusted radially of the bolt for increasing or decreasing the diameter of the cover so that the latter is capable of use with silos of varying diameters. It also enables a cover to remain in air-tight connection with a silo at all times, because while all silos continuously vary somewhat in diameter, owing to shrinkage, as by the contraction of the hoops in the case of most wooden silos, the shutters are enabled to adjust themselves in conformity with the varying diameter of the silo. In use, the cover is adapted to be placed on top of the green silage with the shutter units extended outwardly in circular formation and with their respective arcuate edges 11 in air-tight engagement with the surrounding inner wall of the silo. The cover will thus prevent air from penetrating the top of the silage material and thereby prevent the deterioration of the same. In case the silage is not used out of the silo fast enough to keep the top from beginning to spoil, the cover, instead of being hung to the roof of the silo may be left resting on top of same, so as to descend within the silo as the silage is used. And as the silage is used it is removed through the cover, an opening being provided by sliding back one or more of the shutters of the cover on one side of the silo and pulling them shut again after extracting the silage and on the next occasion for removing silage, by opening shutters on the opposite side of the cover, which is then re-shut in the usual manner. In this way, the silage may be used as slowly as desired without danger of any of the top material becoming damaged from undue exposure to the air. After the cover is in place, nut 20 may be screwed up sufficiently tight to sustain the shutters in their relatively adjusted positions, and close enough to prevent the air from entering between them, or around the bolt, it being noted that the elongated slot of each plate is closed by the successively underlapping shutters. It will thus be seen that the invention provides a cover capable of being collapsed or folded into a compact bundle having means for conveniently supporting it out of the way and being readily adjustable to correspond with the varying diameter of different types or sizes of silos.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claims.

Having thus described my invention, what I claim as new and desire to secure by Letters Patent is:

1. A silage cover comprising a plurality of elements successively overlapping to provide a collapsible structure and adjustable from a common center to correspond to the diameter of the silo with which it is associated, and engaging means on the overlapping edges of the elements.

2. A cover for the silage contents of silos comprising a center bolt, a plurality of shutter elements connected to said bolt, and adjustable radially and concentrically with respect thereto, to provide a foldable cover of overlapping shutters, engaging means on the overlapping edges of the shutter elements, and a nut on the bolt for tightening the shutters in their relatively adjusted positions.

3. In combination with a silage cover, comprising a plurality of collapsible members, of securing means passing through the said members holding the same in assembled relation, said securing means provided with hooks at its respective ends to facilitate the suspension of the cover when in collapsed position.

In testimony whereof I affix my signature in presence of two witnesses.

BERT B. PERKINS.

Witnesses:
 L. N. J. BAUER,
 CELIA THOMPSON.